United States Patent [19]
Hawkins

[11] 3,733,540
[45] May 15, 1973

[54] SWITCHING REGULATOR SWEEP STARTING PROTECTION CIRCUIT

[75] Inventor: George C. Hawkins, Hanover Park, Ill.

[73] Assignee: Motorola, Inc., Franklin Park, Ill.

[22] Filed: Feb. 3, 1972

[21] Appl. No.: 223,099

[52] U.S. Cl....................321/47, 321/18, 323/22 T, 321/45 S
[51] Int. Cl..............................................H02m 7/52
[58] Field of Search..........................321/45 R, 45 S; 323/22 T

[56] References Cited

UNITED STATES PATENTS

| | | | |
|---|---|---|---|
| 3,376,478 | 4/1968 | Sheng et al. | 317/31 |
| 3,458,796 | 7/1969 | Cassady | 321/45 S |
| 3,506,907 | 4/1970 | Porterfield et al. | 321/45 R |
| 3,629,622 | 12/1971 | Denenberg, Jr. | 323/22 T |
| 3,621,372 | 11/1971 | Paine | 323/DIG. 1 X |

*Primary Examiner*—William M. Shoop, Jr.
*Attorney*—Vincent J. Rauner et al.

[57] ABSTRACT

An overload protection system for a switching power supply includes a variable rate and variable pulse duration drive source for operating the switching transistor. Upon turn-on of the power supply, the switching transistor is driven with low repetition rate pulses having a predetermined time duration. The rate is gradually increased to a normal operating rate to minimize turn-on transients. Load sensing circuitry is used in conjunction with the variable rate drive source to cause the drive source to operate at the low rate in the event that an overload is applied to the power supply, and to turn off the drive source if the overload persists. Circuitry for providing automatic reset following an overload is employed. A feedback circuit is used to vary the duration of the drive pulses to provide automatic voltage regulation.

10 Claims, 2 Drawing Figures

SWITCHING REGULATOR SWEEP STARTING PROTECTION CIRCUIT

BACKGROUND

This invention relates generally to power supplies, and more particularly to power supplies employing a switching circuit for regulating the output voltage of the supply.

There are many applications wherein it is desired to provide a self-protected, self-resetting power supply. One such system utilizing such a power supply is a communications radio transmitter.

Several protected, self-resetting power supplies are known. One such system employs circuitry for turning off the switching oscillator in the event of an overload and for turning on the oscillator a predetermined time following the overload. In another such system, the oscillator is turned on at a reduced amplitude following the overload, and the amplitude of oscillations is gradually increased to reduce turn-on transients.

Whereas these techniques provide power supplies that are suitable to certain applications, the first technique is not readily applicable to heavily filtered power supplies because of transients generated in the filter during turn-on. The second technique requires the use of switching transistors capable of withstanding the power dissipated during turn-on when the switching transistors are operated in their linear mode.

SUMMARY

It is an object of the present invention to provide a switching power supply having automatic overload protection and automatic reset.

It is a further object of this invention to provide a switching power supply that can be operated into a highly reactive load without damage to its components.

It is another object of this invention to provide a switching power supply having a controlled voltage build-up.

In accordance with a preferred embodiment of the invention, a variable pulse width multivibrator is employed to drive a switching of transistor. A variable oscillator is used to drive the multivibrator. The pulse width of the multivibrator signal is varied to adjust the output voltage of the power supply. The frequency of the oscillator is reduced during turn-on and during the presence of an overload. Following turn-on, the frequency of the oscillator is gradually increased, thereby providing a controlled voltage build-up at the output of the power supply. Reducing the oscillator frequency during an overload limits the amount of current delivered to the overload, thereby protecting the power supply. In the event that the overload persists, the oscillator is turned off for a predetermined time duration, and is periodically turned on at the reduced frequency until the overload is removed, at which time the frequency is gradually increased until normal operation is achieved.

DETAILED DESCRIPTION

Figure 1:
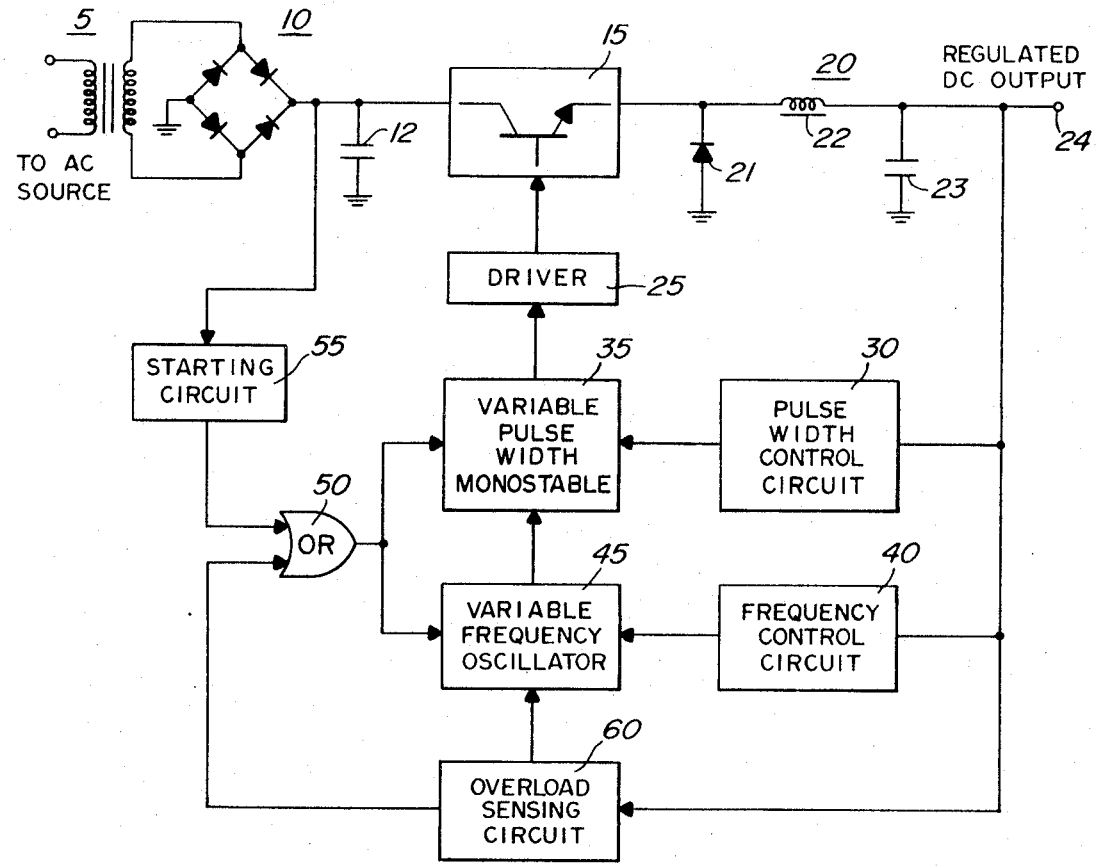
FIG. 1 is a combined block and schematic diagram showing the operation of the starting and protection circuit according to the invention.

Referring to FIG. 1, there is shown a block diagram of the power supply according to the invention. A transformer 5 is connected to a source of alternating current voltage and to a rectifier-filter circuit comprising rectifier bridge 10 and capacitor 12. A switch means such as series transistor switch 15 is connected to the output of rectifier 10 and to the input of a filter circuit 20 comprising diode 21, filter choke 22 and capacitor 23. Switch 15 may be driven by any suitable activating means compatible with the characteristics of switch 15, including such as, for example, driver transistors, oscillators and monostables. Output voltage from the power supply is provided at an output point 24. A driver stage 25 is connected to transistor switch 15. A pulse width control circuit 30 is connected to output point 24 and to a variable pulse width monostable 35, which is in turn connected to driver 25. Pulse width control circuit 30, monostable 35 and driver 25 comprise pulse control means for switch 15 in this embodiment. A frequency control circuit 40 is also connected to output point 24 and to a variable frequency oscillator 45, which is connected to variable pulse width monostable 35. Frequency control circuit 40 and oscillator 45 comprise rate control means for switch 15 in this embodiment. An OR gate 50 is connected for controlling monostable 35 and oscillator 45. A starting circuit 55, which includes timing means, is connected between the output of bridge 10 and an input of OR gate 50. Similarly, an overload sensing circuit 60 is connected between output point 24 and the other input of OR gate 50. Starting circuit 55, OR gate 50 and sensing circuit 60 serve as protection means for the circuit of this embodiment.

In operation, switch 15 is driven by driver 25 to provide current pulses to filter 20. The variable pulse width monostable 35 and the pulse width control circuit 30 determine the time duration of the current pulses, while the variable frequency oscillator 45, which drives the variable pulse width monostable 35, and the frequency control circuit 40 determine the repetition rate of the current pulses. The starting circuit 55 causes the OR gate 50 to enable monostable 35 and oscillator 45 for a predetermined time duration following turn-on of the power supply. Overload sensing circuit 60 causes monostable 35 and oscillator 45 to remain operative following turn-on when the power supply is operating normally.

When the power supply is turned on, starting circuit 55 causes OR gate 50 to apply power to, or otherwise enable, monostable 35 and oscillator 45 for a predetermined time duration, in this embodiment, 200 milliseconds. Oscillator 45 begins to drive monostable 35 at a rate considerably lower than the normal operating frequency of the power supply. In this embodiment, the starting frequency is approximately 1 KHz, and the operating frequency is approximately 20 KHz. The monostable 35 provides pulses having a maximum pulse width of 40 microseconds to driver 25 for driving transistor switch 15 and switch 15 provides current pulses having a time duration of 40 microseconds and a 1 KHz repetition rate to filter 20. Current begins to flow through choke 22 into capacitor 23 as a result of the current pulses from switch 15. The current thus initiated continues to flow through choke 22, capacitor 23 and diode 21 for a predetermined time following the current pulse from switch 15. The time that current continues to flow is determined by the time constant of choke 22 and capacitor 23. In this embodiment, the time between current pulses during power supply turn-on is chosen to be greater than the amount of time required for current to stop flowing through choke 22 in order to reduce the effects of the starting transients of filter 20 on switch 15. The current flow through filter choke 22 and capacitor 23 causes a voltage to build up across capacitor 23. This voltage is applied to frequency control circuit 40 to increase the operating frequency of oscillator 45 as the output voltage across capacitor 23 increases. As the frequency of oscillator 45 increases, the voltage at output point 24 will increase until its value reaches a predetermined operating level. This is normally achieved within the predetermined time set by starting circuit 55. After the voltage at output point 24 has reached its predetermined value, the overload sensing circuit 60 provides a signal to OR gate 50 to maintain monostable 35 and oscillator 45 operative. Pulse width control circuit 30 senses the voltage at output point 24 and adjusts the width of the output pulses from monostable 35 to maintain the voltage at output point 24 constant.

Should an overload, such as, for example, a short circuit be connected to output point 24 during turn-on, the voltage at output point 24 will not increase. The frequency of variable frequency oscillator 45 will be maintained at its low rate to limit the number of current pulses passing through switch 15, thereby maintaining the average current through switch 15 at a value which prevents damage to the supply. If the overload persists, overload sensing circuit 60 will not provide an "on" signal to OR gate 50, and gate 50 will disable monostable 35 and oscillator 45 after the starting signal from starting circuit 55 is removed. The power supply will remain disabled for a predetermined time period, in this embodiment 1 second, after which time the normal starting procedure will be repeated. If the overload has been removed, the power supply will return to normal operation. If not, the supply will cycle between its on and off states until the overload is removed. If the overload is applied after the supply has been turned on, the frequency of oscillator 45 will be immediately reduced to its lowest rate, and will remain at the low rate until the overload is removed or until shut-off by starting circuit 55, after which time the supply will operate in a fashion similar to its operation when it is started into an overload. If the supply has been operating longer than the starting time determined by starting circuit 55, shut-off will occur immediately after the supply is overloaded.

Figure 2:
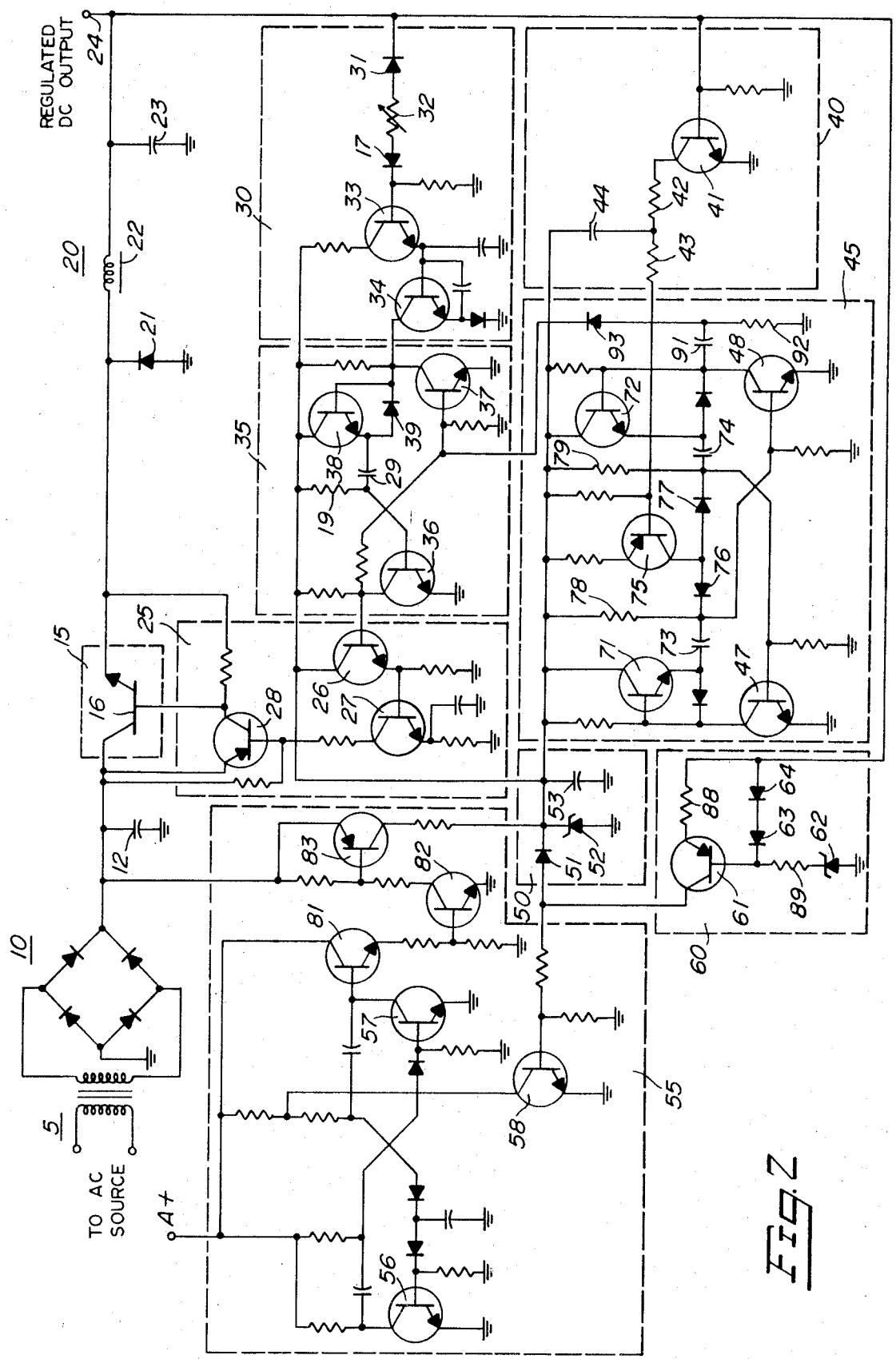
FIG. 2 is a detailed circuit diagram of one embodiment of the power supply starting and protection circuit according to the invention.

Referring to FIG. 2, there is shown a schematic diagram of a power supply according to the invention. The functional blocks of the diagram of FIG. 1 are defined by dashed lines encircling the circuitry providing the function. The blocks are identified by like numbers in each figure. Transistor switch 15 comprises a transistor 16 having a collector connected to rectifier-filter 10 and an emitter connected to filter 20. Driver 25 comprises transistors 26, 27 and 28 and associated components. Transistors 26, 27 and 28 are connected to form a conventional amplifier well known in the art. The input to the amplifier is the base of transistor 26, which is connected to multivibrator 35, and the output of the amplifier is the collector of transistor 28, which is connected to the base of transistor 16.

Variable pulse width monostable 35 comprises a standard monostable multivibrator including transistors 36 and 37, and utilizes an emitter follower transistor 38 and a diode 39 to provide a low impedance charging path for timing capacitor 29. The output of multivibrator 35 is the collector of transistor 36, which is connected to the input of driver 25 at the base of transistor 26. Pulse width control circuit 30 comprises a transistor 33 having a base which is coupled to output point 24 through diode 17, variable resistor 32 and zener diode 31. A transistor 34 having a collector connected to the collector of transistor 37 and a base connected to the emitter of transistor 33 comprises the output stage of pulse width control circuit 30.

Variable frequency oscillator 45 is a conventional astable multivibrator comprising transistors 47 and 48, and includes emitter follower outputs comprising transistors 71 and 72 for driving timing capacitors 73 and 74, respectively. A variable current source comprising transistor 75 having a base connected to frequency control circuit 40 and a collector connected to diodes 76 and 77 supplies current to timing capacitors 73 and 74 through diodes 76 and 77, respectively. Resistors 78 and 79 are connected between the power supply bus and capacitors 73 and 74, respectively, and supply current to capacitors 73 and 74.

Frequency control circuit 40 comprises a transistor 41 having a base connected to output point 24 and resistors 42 and 43 which are connnected between the collector of transistor 41 and the base of transistor 75 of oscillator 45. A capacitor 44 is connected between he junction of resistors 42 and 43 and the power supply bus for oscillator 45.

The OR gate 50, which enables monostable 35 and oscillator 45, comprises a diode 51 having an anode connected to the anode of a zener diode 52, and a capacitor 53 which is connected in parallel with zener diode 52.

The overload sensing circuit 60 comprises a transistor 61 having a collector connected to the cathode of diode 51 of OR gate 50 and an emitter connected through a resistor 88 to output point 24 of the power supply. A base of transistor 61 is connected through a resistor 89 to a zener diode 62 which serves as a voltage reference. A pair of biasing diodes 63 and 64 are connected in series between the base of transistor 61 and output 24.

The starting circuit 55 comprises an astable multivibrator including transistors 56 and 57. Starting circuit 55 also includes a multivibrator control transistor 58 and amplifier transistors 81, 82 and 83 which form an amplifier coupling the collector of multivibrator transistor 57 to an input of OR gate 50.

When the power supply is initially turned on, transistor 57 provides a positive output pulse to transistor 81 to turn on transistors 81, 82 and 83, thereby completing a circuit between the output of rectifier bridge 10 and zener diode 52. Zener diode 52 breaks down, causing a regulated voltage to be applied to the power supply bus that supplies power to monostable 35 and oscillator 45. Oscillator 45 begins to oscillate at a rate determined by the time constants of resistor 78 and capacitor 73, and resistor 79 and capacitor 74. This is the low frequency mode of oscillation.

Output pulses from oscillator 45 are taken from the collector of transistor 48 and are differentiated by a resistance capacitance network, comprising resistor 92 and capacitor 91 which is connected to the collector of transistor 48. The differentiated pulses are applied to the base of transistor 37 of monostable 35 through a diode 93. The differentiated pulses applied to the base of transistor 37 cause transistor 37 to turn on and transistor 36 to turn off, thereby causing the voltage appearing at the collector of transistor 36 to increase. The voltage at the collector of transistor 36 remains high until capacitor 29 is charged through resistor 19, diode 38 and transistor 37 to a sufficient level to allow transistor 36 to turn on. The time required to charge capacitor 29 determines the duration of the positive pulse applied to driver 25.

The positive pulse from the collector of transistor 36 is applied to the base of transistor 26 of driver 25 and is amplified thereby. The pulse is subsequently applied to the transistors 27 and 28 for further amplification. The amplified pulse appears at the collector of transistor 28 and is applied to the base of transistor 16 of switch 15, thereby rendering transistor 16 conductive during the duration of the positive pulse.

When transistor 16 becomes conductive, current flows from rectifier bridge 10 through transistor 15, filter choke 20 and capacitor 23, causing a voltage to appear at output point 24. The voltage appearing at output point 24 is applied to the base of transistor 41, thereby rendering transistor 41 conductive and reducing the voltage at the collector of transistor 41. When transistor 41 is made conductive, current flows from the power supply bus through capacitor 44, resistor 42 and transistor 41. The voltage at the junction of capacitor 44 and resistor 42 drops at a rate determined by the charging time of capacitor 44. As the voltage at the junction of capacitor 44 and resistor 42 drops, the base of transistor 75, which is coupled to the aforesaid junction through resistor 43, is forward biased, thereby rendering transistor 75 conductive. The degree of conductivity of transistor 75 is determined by the voltage at the junction of capacitor 44 and resistor 42. As transistor 75 becomes conductive, charging current is supplied by transistor 75 to capacitors 73 and 74 through diodes 76 and 77, respectively, thereby reducing the charging time of capacitors 73 and 74, and increasing the frequency of oscillator 45. Under normal operating conditions, oscillator 45 reaches its maximum oscillation frequency within a length of time less than the duration of the pulse provided by starting circuit 55 to OR gate 50.

As the frequency of oscillation of oscillator 45 approaches its maximum operating value, the voltage at output point 24 approaches its desired value. The output voltage is applied to zener diode 62 of the overload sensing circuit 60 through resistor 89, the series connected diodes 63 and 64, and the series combination of resistor 88 and the base-emitter junction of transistor 61. When the value of the voltage at output point 24 is sufficiently high to cause zener diode 62 to break down, current flows through the base emitter-junction of transistor 61, rendering transistor 61 conductive. This completes a circuit between output point 24 and the anode of diode 51 of OR gate 50, thereby enabling OR gate 50 to continue supplying power to monostable 35 and oscillator 45 after the starting pulse from starting circuit 55 has passed. Transistor 58, which is also coupled to the collector of transistor 61 is also rendered conductive thereby resetting the starting circuit multivibrator comprising transistors 56 and 57 and removing the starting pulse from OR gate 50.

Regulation of the output voltage of the power supply is obtained as follows. As the voltage at output point 24 approaches its regulated value, zener diode 31 of pulse width control circuit 30 breaks down allowing current to flow through zener diode 31, resistor 32, and the base-emitter junctions of transistors 33 and 34, thereby making transistors 33 and 34 conductive. The collector of transistor 34 is connected to the collector of transistor 37 and limits the level to which the voltage at the collector of transistor 37 can rise when transistor 37 is turned off. This in turn limits the charge that can be place on capacitor 29 by emitter follower 38 when transistor 37 is off and transistor 36 is on. As the voltage at output point 24 increases, transistor 34 becomes more conductive, further limiting the charge on capacitor 29. As the charge placed on capacitor 29 by emitter follower 38 is reduced, the amount of time required to charge capacitor 29 through resistor 19 when transistor 37 is rendered conductive decreases, and the width of the pulse supplied by monostable 35 is correspondingly decreased. This in turn reduces the amount of time that transistor 16 remains conductive and prevents the voltage at output point 24 from exceeding a predetermined value. The value of the voltage at output point 24 may be adjusted by means of variable resistor 32.

In the event that an overload is connected to output point 24, the voltage at point 24 will drop, and render transistor 61 nonconductive. The voltage applied to the anode of diode 51 of OR gate 50 will drop to substantially zero, causing oscillator 45 and monostable 35 to be disabled, thereby disabling the entire power supply. Simultaneously, the starting circuit 55 will be enabled and will provide starting pulses to OR gate 50, and the power supply will cycle between its low frequency switching state and its off state until the overload is removed.

In summary, the techniques of the instant invention provide a way to achieve controlled start-up and overload protection for a switching power supply without the use of dissipative linear elements. The variable frequency starting and protection circuitry is fully compatible with pulse width modulation voltage regulation circuitry to provide a fully regulated protected high power supply.

I claim:

1. A switching power supply control circuit for controlling the output voltage applied to an output point from a direct current source, including in combination, switch means connected to said source and to said output point for controlling the output voltage delivered to said output point by said source, said switch means having a conductive state for passing current to said load and a nonconductive blocking state, pulse control means for rendering said switch means conductive for a predetermined time duration connected to said switch means, said pulse control means being further connected to said output point and responsive to the voltage thereat for adjusting said time duration in a manner tending to maintain said output voltage substantially constant, rate control means for causing said switch means to be rendered alternately conductive and nonconductive at a predetermined rate connected to said pulse control means, said rate control means being further connected to said output point and responsive to the voltage thereat for causing said switch means to be alternately rendered conductive and nonconductive at a rate lower than said predetermined rate when the output voltage at said output point is below a predetermined level.

2. A control circuit as recited in claim 1 further including protection means coupled to said pulse control means and to said output point, said protection means being responsive to said output voltage for maintaining said pulse control means operative to render said switch means conductive when said output voltage exceeds a predetermined value, and starting means coupled to said pulse control means for rendering said pulse control means operative for a predetermined time interval, said control means thereby being rendered operative by said starting means and maintained operative after said predetermined time interval by said protection means when the output voltage exceeds a predetermined level.

3. A switching power supply control circuit as recited in claim 1 wherein said pulse control means includes monostable means for applying pulses to said switch means connected to said switch means, said monostable means being further connected to said output point and responsive to the voltage thereat for altering the width of said pulses to increase the time duration thereof for increasing the time duration said switch is rendered conductive when said output voltage drops below a predetermined level.

4. A switching power supply control system as recited in claim 3 wherein said rate control means includes voltage controlled oscillator means connected to said monostable means for providing oscillations thereto, said oscillator means being connected to said output point and responsive to the voltage thereat for varying the frequency of said oscillations, said frequency being decreased in response to a decrease in said output voltage.

5. A starting and protection circuit for a power supply utilizing an electronic switch having conductive and nonconductive states for controlling the output voltage applied to an output point of said supply, including in combination, means for periodically activating said switch to the conductive state at a predetermined periodic rate connected to said switch, means for controlling said rate connected to said activating means and to said output point, said rate control means being responsive to the voltage at said output point for decreasing said periodic rate in response to a decrease in said output voltage and for increasing said periodic rate in response to an increase in said output voltage.

6. A starting and protection circuit as recited in claim 5 further including sensing means coupled to said activating means and to said output point for maintaining said activating means operative when said output voltage exceeds a predetermined level.

7. A starting and protection circuit as recited in claim 6 further including starting means coupled to said activating means for rendering said activating means operative for a predetermined time interval.

8. A starting and protection circuit as recited in claim 7 further including OR circuit means having inputs connected to said starting means and said sensing means, and an output connected to said activating means, said OR circuit means being responsive to said starting means for rendering said activating means operative for a predetermined time interval, and to said sensing means for maintaining said activating means operative after said predetermined time interval when said output voltage exceeds a predetermined level.

9. A starting and protection circuit as recited in claim 8 wherein said starting means includes means for repetitively rendering said activating means operative.

10. A starting and protection circuit as recited in claim 8 further including control means connected to said activating means and to said output point, said control means being responsive to the voltage at said output point for increasing the time during each period that said switch is maintained conductive in response to a decrease in the output voltage and for decreasing the time during each period that said switch is maintained conductive in response to an increase in the output voltage.

* * * * *